US009760925B2

United States Patent
Petrimoulx et al.

(10) Patent No.: US 9,760,925 B2
(45) Date of Patent: Sep. 12, 2017

(54) RATING AND RANKING CONTROLLED SUBSTANCE DISTRIBUTION STAKEHOLDERS

(71) Applicants: Harold J. Petrimoulx, Phoenixville, PA (US); Jan Biddulph-Krentar, West Chester, PA (US); Yu Chen, Mississauga (CA); Mark Rathman, Royersford, PA (US); Hossam Sadek, Phoenixville, PA (US); Barry W. Summers, Yardley, PA (US)

(72) Inventors: Harold J. Petrimoulx, Phoenixville, PA (US); Jan Biddulph-Krentar, West Chester, PA (US); Yu Chen, Mississauga (CA); Mark Rathman, Royersford, PA (US); Hossam Sadek, Phoenixville, PA (US); Barry W. Summers, Yardley, PA (US)

(73) Assignee: Quintiles IMS Incorporated, Danbury, CT (US)

( * ) Notice: Subject to any disclaimer, the term of this patent is extended or adjusted under 35 U.S.C. 154(b) by 230 days.

(21) Appl. No.: 13/842,460

(22) Filed: Mar. 15, 2013

(65) Prior Publication Data

US 2014/0188498 A1 Jul. 3, 2014

Related U.S. Application Data

(60) Provisional application No. 61/748,367, filed on Jan. 2, 2013.

(51) Int. Cl.
*G06Q 30/06* (2012.01)

(52) U.S. Cl.
CPC ............... *G06Q 30/0607* (2013.01)

(58) Field of Classification Search
CPC ........ G06Q 50/22; G06Q 50/24; G06Q 40/08; G06Q 10/10; G06F 19/322
See application file for complete search history.

(56) References Cited

U.S. PATENT DOCUMENTS 8,280,747 B1* 10/2012 Sholtis et al. ............... 705/2
2012/0265552 A1* 10/2012 Rabinowitz et al. ............. 705/2

* cited by examiner

*Primary Examiner* — Michelle L Le
(74) *Attorney, Agent, or Firm* — Fish & Richardson P.C.

(57) ABSTRACT

The disclosure generally describes computer-implemented methods, software, and systems for rating and ranking stakeholders in the distribution of controlled substances. One computer-implemented method includes receiving, at a computer system, retail prescription data, encrypted patient data, reference prescriber data, and pharmaceutical purchase data. For a retail outlet included in the received data, the method includes aggregating the received data and determining information about sales of a pharmaceutical product associated with the retail outlet. The method further includes rating the retail outlet based on the aggregated information.

21 Claims, 7 Drawing Sheets

RATING AND RANKING CONTROLLED SUBSTANCE DISTRIBUTION STAKEHOLDERS

CROSS-REFERENCE TO RELATED APPLICATIONS

This application claims the benefit of U.S. Provisional Application No. 61/748,367, filed Jan. 2, 2013, which is incorporated herein in its entirety by reference.

BACKGROUND

In the United States, pharmaceutical wholesalers and retailers with a valid license from the Drug Enforcement Agency (DEA) can legally possess and distribute products that fall under Schedule II through Schedule V on the DEA's schedule of controlled substances. However, stakeholders in the pharmaceutical supply chain have experienced increasing interruptions in operations due to DEA investigations and related actions because of concerns regarding illicit use of controlled substances.

In the case of wholesalers, DEA claims may be based on wholesalers filling orders from customers who, according to the DEA and possibly unbeknownst to the wholesaler, were knowingly or unknowingly allowing illicit use of controlled products. The DEA expects wholesalers to detect and reject orders that are not for legitimate use (even if the pharmacy ordering the product has a valid DEA license to purchase the products). However, wholesalers may not have insight into their customers' total purchase volumes or their business practices and what they ultimately do with the received controlled product(s) or what is driving the demand for the product(s).

In the case of retailers, individual retail outlets may not have insight into how their sales volume of a controlled substance compares to the sales volume of nearby competitor retail outlets and thereby not know what is or is not abnormal quantities being dispensed. Moreover, when a retail outlet experiences abnormal sales volume of a controlled substance, the retail outlet may not have insight into the possible prescriber(s) and/or patient (i.e., customer) abuse that may be the cause of the abnormal volume. For example, retailers may not be aware of customer purchases made in other locations and therefore would not be aware of identical products purchased, or products purchased that could be used in combination for non-medicinal effects.

In the case of prescribers, individual prescribers may not have insight into how their use of controlled substances compares to prescribing habits of other prescribers in a similar specialty/profession and a similar geography. Moreover, a prescriber may not have insight into patients who are visiting multiple prescribers ("doctor shopping") and receiving prescriptions for identical products or other products that can be used in combination for non-medicinal effects. Additionally, prescribers may not be aware that their information is being used (through, for example, forgery or duplicated prescriptions) to fill prescriptions unbeknownst to them.

SUMMARY

The present disclosure relates to computer-implemented methods, software, and systems for rating and ranking stakeholders in the distribution of controlled substances. One computer-implemented method includes receiving, at a computer system, retail prescription data that includes information about sales of a pharmaceutical product from a first set of retail outlets to a first set of anonymous patients; receiving, at the computer system, encrypted patient data that includes information about prescriptions for the pharmaceutical product issued by a first set of prescribers on behalf of a second set of anonymous patients; receiving, at the computer system, reference prescriber data that includes demographic information about a second set of prescribers; receiving, at the computer system, pharmaceutical purchase data that includes information about sales of a pharmaceutical product from a first set of distributers to a second set of retail outlets; for a retail outlet included in one or more of the first set of retail outlets and the second set of retail outlets, aggregating, by the computer system, the received retail prescription data and the received pharmaceutical purchase data associated with the retail outlet and determining information about sales of the pharmaceutical product associated with the retail outlet; and rating the retail outlet included in one or more of the first set of retail outlets and the second set of retail outlets based on the determined information about sales of the pharmaceutical product associated with the retail outlet.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

Another computer-implemented method includes: receiving, at a computer system, retail prescription data that includes information about sales of a pharmaceutical product from a first set of retail outlets to a first set of patients; receiving, at the computer system, encrypted patient data that includes information about prescriptions for the pharmaceutical product issued by a first set of prescribers on behalf of a second set of patients; receiving, at the computer system, reference prescriber data that includes demographic information about a second set of prescribers; receiving, at the computer system, pharmaceutical purchase data that includes information about sales of a pharmaceutical product from a first set of distributers to a second set of retail outlets; and for each patient included in one or more of the first set of patients and the second set of patients, rating, at the computer system, the patient based on the received retail prescription data, encrypted patient data, reference prescriber data, and pharmaceutical purchase data associated with: (1) the patient, (2) one or more prescribers associated with the patient, and (3) one or more retail outlets associated with the patient.

Another computer-implemented method includes: receiving, at a computer system, retail prescription data that includes information about sales of a pharmaceutical product from a first set of retail outlets to a first set of patients; receiving, at the computer system, encrypted patient data that includes information about prescriptions for the pharmaceutical product issued by a first set of prescribers on behalf of a second set of patients; receiving, at the computer system, reference prescriber data that includes demographic information about a second set of prescribers; receiving, at the computer system, pharmaceutical purchase data that includes information about sales of a pharmaceutical product from a first set of distributers to a second set of retail outlets; and for each prescriber included in one or more of the first set of prescribers and the second set of prescribers, rating, at the computer system, the prescriber based on the received retail prescription data, encrypted patient data, reference prescriber data, and pharmaceutical purchase data associated with: (1) the prescriber, (2) one or more patients associated with the prescriber, and (3) one or more retail outlets associated with the prescriber.

Another computer-implemented method includes: receiving, at a computer system, retail prescription data that includes information about sales of a pharmaceutical product from a first set of retail outlets to a first set of patients; receiving, at the computer system, encrypted patient data that includes information about prescriptions for the pharmaceutical product issued by a first set of prescribers on behalf of a second set of patients; receiving, at the computer system, reference prescriber data that includes demographic information about a second set of prescribers; receiving, at the computer system, pharmaceutical purchase data that includes information about sales of a pharmaceutical product from a first set of distributers to a second set of retail outlets; and for each retail outlet included in one or more of the first set of retail outlets and the second set of retail outlets, rating, at the computer system, the retail outlet based on the received retail prescription data, encrypted patient data, reference prescriber data, and pharmaceutical purchase data associated with: (1) the retail outlet, (2) one or more patients associated with the retail outlet, and (3) one or more prescribers associated with the retail outlet.

These and other embodiments may each optionally include one or more of the following features. For instance, the method may further include, for an anonymous patient included in one or more of the first set of patients and the second set of patients, aggregating, by the computer system, the received retail prescription data and the received encrypted patient data associated with the anonymous patient and determining information about sales of the pharmaceutical product associated with the anonymous patient; and rating the anonymous patient included in one or more of the first set of patients and the second set of patients based on the determined information about sales of the pharmaceutical product associated with the anonymous patient.

The method may include rating the anonymous patient with regard to pharmaceutical acquisition and consumption behavior based on information contained in the received retail prescription data about combinations of pharmaceutical products consumed by the anonymous patient.

The method may include, for a prescriber included in one or more of the first set of prescribers and the second set of prescribers, aggregating, by the computer system, the received encrypted patient data and the received reference prescriber data associated with the prescriber and determining information about sales of the pharmaceutical product associated with the prescriber; and rating the prescriber included in one or more of the first set of prescribers and the second set of prescribers based on the determined information about sales of the pharmaceutical product associated with the prescriber.

Aggregating the received retail prescription data and the received pharmaceutical purchase data associated with the retail outlet may include linking the received retail prescription data and the received pharmaceutical purchase data associated with the retail outlet to a profile of the retail outlet. The method may include ranking the anonymous patient included in one or more of the first set of patients and the second set of patients by comparing the ranking of the anonymous patient to rankings of other anonymous patients. The method may include ranking the prescriber included in one or more of the first set of prescribers and the second set of prescribers by comparing the ranking of the prescriber to rankings of other prescribers.

The method may include ranking the retail outlet included in one or more of the first set of retail outlets and the second set of retail outlets by comparing the ranking of the retail outlet to with the rankings of other retail outlets. Rating the anonymous patient included in one or more of the first set of anonymous patients and the second set of anonymous patients may include calculating a normalized function of at least a portion of the received retail prescription data and the received encrypted patient data associated with the anonymous patient.

Rating the prescriber included in one or more of the first set of prescribers and the second set of prescribers may include calculating a normalized function of at least a portion of the received encrypted patient data and the received reference prescriber data associated with the prescriber. Rating the retail outlet included in one or more of the first set of retail outlets and the second set of retail outlets may include calculating a normalized function of at least a portion of the received retail prescription data and the received pharmaceutical purchase data associated with the retail outlet.

The method may include deriving metrics based on the determined information about sales of the pharmaceutical product associated with the anonymous patient, the derived metrics being non-inherent from the received retail prescription data and the received encrypted patient data associated with the anonymous patient. The derived metrics may include the percentage of purchases for the pharmaceutical product paid for with cash by the anonymous patient.

The received retail prescription data may include data reflecting all pharmaceutical products dispensed by the first set of retail outlets including information about the type of prescription used to obtain each dispensed pharmaceutical product and the payment method used to purchase each dispensed pharmaceutical product. The received encrypted patient data may include data reflecting any scripts filled by the second set of anonymous patients at any retail outlet from which data has been received and scripts written for the second set of anonymous patients by any prescriber from whom data has been received.

The received reference prescriber data may include one or more of the following pieces of information for each of the prescribers in the second set of prescribers: demographic information, address, affiliations, governmental authorization data, profession, and specialty. The received pharmaceutical purchase data may include data about each purchase of the pharmaceutical product between distributors in the first set of distributors and retail outlets in the second set of retail outlets, the data about each purchase of the pharmaceutical product including information about the distributor in the first set of distributors and the retail outlet in the second set of retail outlets involved in the purchase, a type of the pharmaceutical product purchased, the location of both the distributor in the first set of distributors and the retail outlet in the second set of retail outlets involved in the purchase t, when the purchase was conducted, and an amount of the pharmaceutical product that was purchased.

The subject matter described in this specification can be implemented in particular implementations so as to realize one or more of the following advantages. First, the controlled substances rating system described herein receives and analyzes data regarding retail outlets, prescribers, and patients to provide a more comprehensive view of potential misuse of controlled substances. Secondly, the ratings and rankings of retail outlets, prescribers, and patients may provide an input into determining compliance with DEA regulations. Third, the outlet, prescriber, and patient rankings help to focus retailer and wholesaler attention to the highest priority entities for further evaluation. Fourth, the ratings provide the retailer, prescriber, or wholesaler perspective on how atypical the behavior of an outlet, prescriber, or patients of the prescribers is on various measures and across aggregate measures relative to comparator peer groups, which can be used to establish normative patterns of prescribing and dispensing behavior.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
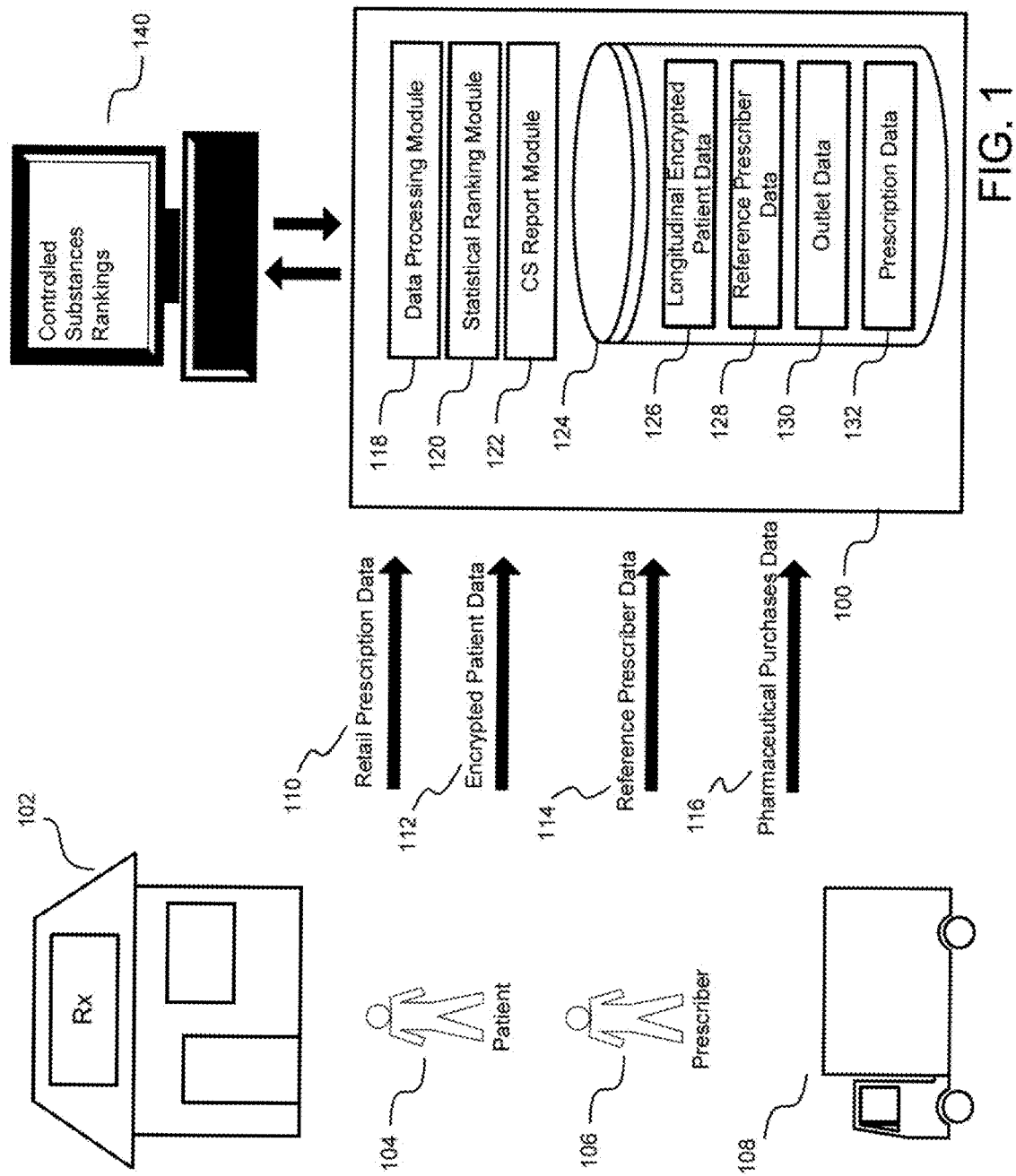
FIG. 1 is a block diagram illustrating an example system for rating and ranking stakeholders in the distribution of controlled substances.

This disclosure generally describes computer-implemented methods, software, and systems for rating and ranking stakeholders in the distribution of controlled substances.

For illustration purposes, the various implementations described herein will be described with regard to a controlled substances rating system that receives data regarding patients, prescribers, and pharmaceutical retailers and rates these stakeholders with regard to the sale/distribution/prescription of one or more controller substances. As will be described in greater detail below, the controlled substances rating system provides wholesalers, retailers, and prescribers of the one or more controlled substances with a broad view of the market of the one or more controlled substances at a local and/or national level.

Multiple stakeholders within the distribution process may participate, knowingly or unknowingly, in the conduct of illicit activity. In one example, a physician may instruct an illicit user of controlled substances to fill multiple prescriptions for a controlled substance at many different pharmacies or an illicit user of controlled substances may him/herself decide to fill multiple prescriptions for a controlled substance at many different pharmacies, thus reducing the likelihood that any one pharmacy will be able to detect the large number of illicit prescriptions being written and filled. In another example, a patient wishing to illicitly obtain a controlled substance may visit many different physicians to request prescriptions of the controlled substance, thus reducing the likelihood that any one prescriber will notice the large volume of the controlled substance the patient obtains.

In yet another example, a single retail outlet may order quantities of a controlled substance from many different wholesalers and/or manufacturers and dispense the controlled substance outside of the proper sales system.

The broad view of the market provided by the controlled substances rating system may therefore help the wholesalers, retailers, and prescribers to comply with the DEA's regulations requiring the monitoring and reporting of suspicious activity. For example, the controlled substances rating system may provide an indication of which prescribers are prescribing a relatively large volume of a controlled substance regardless of where the prescriptions are filled or which retail outlets are dispensing a relatively large volume of a controlled substance regardless of whether the retail outlet orders the controlled substance from multiple unrelated wholesalers. In other words, the controlled substances rating system provides retail outlets and wholesalers a view of information beyond what they can determine from their own sales or prescription data.

Though the ratings and rankings produced by the controlled substances rating system are not meant as proof of violations, the ratings and rankings may help a wholesaler, retailer, or prescriber identify suspicious activity and provide an input in determining whether a wholesaler, retailer, or prescriber should conduct further investigations into the suspicious activity.

Additionally or alternatively, received data regarding distributors, patients, prescribers, and pharmaceutical retailers may be used to identify other pharmaceutical product supply chain disruptions beyond the sales of controlled substances. For example, the systems described herein could use the received data regarding distributors, patients, prescribers, and pharmaceutical retailers to identify entities attempting to hoard pharmaceutical products/ingredients that are in short supply. When important pharmaceutical products/ingredients are in short supply, actors within the pharmaceutical product/ingredient supply chain (e.g., suppliers or distributors) may buy quantities of the pharmaceutical product/ingredient without any immediate intent to sell the product/ingredient, but to hold the product/ingredient until the short supply greatly increases prices. As a result, some hospitals or other high-need entities/locations are deprived of the important pharmaceutical product/ingredient. The systems described herein may, for example, use the received data regarding distributors, patients, prescribers, and pharmaceutical retailers to identify actors within the supply chain that are purchasing the pharmaceutical product/ingredient in short supply and not selling the product/ingredient to end users.

In another example, the systems described herein could use the received data regarding distributors, patients, prescribers, and pharmaceutical retailers to identify the existence of counterfeit pharmaceutical products in the supply chain. The systems described herein may, for example, use the received data regarding distributors, patients, prescribers, and pharmaceutical retailers to compare the known legitimate manufacturer output of a pharmaceutical product to all wholesalers with the total amount of the pharmaceutical product being sold to patients by retail pharmaceutical outlets and other end-user pharmaceutical product sales entities. Products that are sold in greater quantities than have been produced could be an indication that quantities of an unauthorized product have entered into the supply chain and are being distributed to pharmacies/patients.

For ease of explanation, various implementations described herein will be described with regard to a controlled substances rating system. However, the above-included examples illustrate that these various implementations are not limited to the distribution of controlled substances. Rather, the data collected by the various implementations described herein may be equally applicable to gathering information about any illegal, illicit, or otherwise undesirable disruptions within the supply chain of pharmaceutical products.

FIG. 1 illustrates an example controlled substances rating system implemented in a computing system 100 configured for rating and ranking stakeholders in the distribution of controlled substances. At a high-level, the illustrated example computing system 100 receives various data about retail pharmaceutical outlets 102, patients 104, prescribers 106, and pharmaceutical distributors 108. The data may include retail prescription data 110, encrypted patient data 112, reference prescriber data 114, and pharmaceutical purchase data 116.

The retail prescription data 110 may include data regarding prescriptions dispensed in the retail sector. The retail prescription data 110 may be received, for example, from one or more retail pharmaceutical outlets 102 and represent data reflecting all pharmaceutical products dispensed by the one or more outlets 102, including information about the type of prescription used to obtain the product and the payment method used to purchase the product. The one or more retail pharmaceutical outlets 102, which may include pharmacy chains, independent pharmacies, long-term care facilities, and/or mail services, may provide the retail prescription data 110 on a periodic basis (e.g., every day, week, or month). Moreover, the retail prescription data 110 may be received from patients 104, prescribers 106, and pharmaceutical distributors 108. Additionally or alternatively, the retail prescription data 110 may be collected by one or more other data collection systems and then provided to the computing system 100.

The encrypted patient data 112 may include anonymized retail patient-level data for the one or more patients 104. For example, the encrypted patient data 112 may include information about retail pharmacy-sourced prescription insurance claims, retail pharmaceutical scripts, and/or patient profile data. The encrypted patient data 112 may be received from one or more of the retail pharmaceutical outlets 102, patients 104, prescribers 106, and/or pharmaceutical distributors 108. For example, the encrypted patient data 112 may be received from one or more prescribers/physicians with which a patient interacts, insurance companies to which a patient submits insurance claims, and/or retailers at which a patient purchases a pharmaceutical product. Additionally or alternatively, the encrypted patient data 112 may be collected by one or more other data collection systems and then provided to the computing system 100.

The reference prescriber data 114 may include background information for one or more prescribers 106. For example, the reference prescriber data 114 may include a prescriber's demographic information, address, affiliations, authorization data (e.g., DEA, AOA, SLN, and/or NPI numbers), profession, and/or specialty. In some implementations, the reference prescriber data 114 may be received from one or more of the retail pharmaceutical outlets 102, patients 104, prescribers 106, and/or pharmaceutical distributors 108. For example, the reference prescriber data 114 may be provided by the prescribers 106 themselves. However, the reference prescriber data 114 may additionally or alternatively be received from one or more other entities not shown in FIG. 1 (e.g., government agencies or professional medical organizations). Additionally or alternatively, the reference prescriber data 114 may be collected by one or more other systems and then provided to the computing system 100.

The pharmaceutical purchase data 116 may include information about pharmaceutical purchases made from distributors 108 (e.g., pharmaceutical wholesalers or manufacturers) by one or more retail pharmaceutical outlets 102 or other distributors 108. For example, the pharmaceutical purchase data 116 may include information about the outlet from which a pharmaceutical product is purchased, the type of pharmaceutical product purchased, the location of both the purchaser and seller of the pharmaceutical product, when the purchase was conducted, and/or the amount of a pharmaceutical product that was purchased. The pharmaceutical purchase data 116 may be received from one or more of the retail pharmaceutical outlets 102, patients 104, prescribers 106, and/or pharmaceutical distributors 108. For example, the distributors 108 may provide the pharmaceutical purchase data 116 regarding the pharmaceutical products the distributors 108 have sold. Additionally or alternatively, the pharmaceutical purchase data 116 may be collected by one or more other systems and then provided to the computing system 100.

The retail prescription data 110, encrypted patient data 112, reference prescriber data 114, and pharmaceutical purchase data 116 represent a nationwide, macro view of the sales of pharmaceutical products. For example, the retail prescription data 110, encrypted patient data 112, reference prescriber data 114, and pharmaceutical purchase data 116 may be acquired/received by a third-party operator of the computing system 100 from many different companies and/or entities within all levels the pharmaceutical product supply chain. Thus, the received retail prescription data 110, encrypted patient data 112, reference prescriber data 114, and pharmaceutical purchase data 116 may represent a much wider breadth of information than the information to which any one company and/or actor within the pharmaceutical product supply chain would individually have access.

For illustrative purposes, computing system 100 will be described as including a data processing module 118, a statistical ranking module 120, a controlled substances reporting module 122, and a storage device 124. However, the computing system 100 may be any computing platform capable of performing the described functions. For example, the computing system 100 may include one or more servers that may include hardware, software, or a combination of both for performing the described functions. Moreover, the data processing module 118, the statistical ranking module 120, and the controlled substances reporting module 122 may be embodied together or separately in hardware and/or software. Though the data processing module 118, the statistical ranking module 120, and the controlled substances reporting module 122 will be described as each carrying out certain functionality, the described functionality may be performed by one or more other modules in conjunction with or in place of the described module.

The data processing module 118 receives and processes retail prescription data 110, encrypted patient data 112, reference prescriber data 114, and pharmaceutical purchase data 116. In processing the received data, the data processing module 118 may filter the retail prescription data 110, encrypted patient data 112, reference prescriber data 114, and pharmaceutical purchase data 116 for specific information. For example, the data processing module 118 may filter the received retail prescription data 110, encrypted patient data 112, reference prescriber data 114, and pharmaceutical purchase data 116 for specific controlled substances.

After processing the received retail prescription data 110, encrypted patient data 112, reference prescriber data 114, and pharmaceutical purchase data 116, the data processing module 118 aggregates the processed data into longitudinal encrypted patient data 126, prescriber data 128, outlet data 130, and prescription data 132. In some implementations, the data processing module 118 may create profiles for each patient, prescriber, and retail outlet for which data is received. During aggregation, relationships between prescriber and outlet, patient and outlet, and/or prescriber and patient may be established.

For example, retail prescription data 110 may include information about a retail outlet that dispenses one or more pharmaceutical products, information about one or more patients that purchased the pharmaceutical products, and information about one or more prescribers that wrote the scripts used by the patients to obtain the pharmaceutical products. In this example, data processing module 118 would add information contained in the received retail prescription data 110 into profiles associated with the retail outlet, the one or more patients, and the one or more prescribers. In another example, encrypted patient data 112 may include information about a patient that received prescriptions for a pharmaceutical product and information about one or more prescribers from which the patient received the prescriptions. In this example, data processing module 118 would add information contained in the received encrypted patient data 112 into profiles associated with the patient and the one or more prescribers.

In other implementations, the data processing module 118 may simply sort and store processed retail prescription data 110, encrypted patient data 112, reference prescriber data 114, and pharmaceutical purchase data 116, the data processing module 118 for later use by other modules.

For each patient with regard to whom encrypted data has been received, the longitudinal encrypted patient data 126 may include any information related to the prescription and/or sale of one or more types of pharmaceutical products. For example, longitudinal encrypted patient data 126 may include the volume of each type of pharmaceutical product the patient has purchased, cumulative days' supply of a pharmaceutical product the patient should still have, cumulative dosage of a pharmaceutical product, medication possession ratio, the number and/or name of doctors from which the patient has received scripts, the number and/or name of retail outlets from which the patient has purchased pharmaceutical products, and/or information regarding the payment method(s) used by the patient when purchasing pharmaceutical products (e.g., cash or insurance).

For each prescriber with regard to whom data has been received, the reference prescriber data 128 may include any information related to the prescriber DEA(s), profession(s), specialties, affiliations, and addresses. Address information could include home address and the address of any facility where a prescriber can be reached, including old addresses. An address intelligence algorithm determines the primary address and a rank is provided to signify the type for each address.

For each prescriber with regard to whom data has been received, the prescription data 132 may include any information related to prescriptions written by the prescriber for one or more types of pharmaceutical products and the patients to whom the prescriptions were written. For example, the volume of one or more types of pharmaceutical products for which the prescriber has written a prescription, the percentage of prescriptions for one or more types of pharmaceutical products written by a prescriber in relation to the total number prescriptions written by the prescriber, the percentage of prescriptions for one or more types of pharmaceutical products that are paid for with cash, and/or the number of patients for whom the prescriber has written a prescription for one or more types of pharmaceutical products and who currently have a supply of the one or more types of pharmaceutical products that exceeds a threshold.

For each retail outlet with regard to which data has been received, the outlet data 130 may include any information related to the sales of one or more types of pharmaceutical products, patients to whom sales of one or more types of pharmaceutical products were made, and/or prescribers who wrote the scripts upon which the sales of one or more types of pharmaceutical products were based. For example, the outlet data 130 may include the volume of one or more types of pharmaceutical products sold by the outlet, the percentage of sales of one or more types of pharmaceutical products in relation to the total sales by the retail outlet, the percentage of sales of one or more types of pharmaceutical products that are paid for with cash.

The statistical ranking module 120 uses the longitudinal encrypted patient data 126, prescriber data 128, prescription data 132 and/or outlet data 130 to rate and rank individual patients, prescribes, and retail outlets. In some implementations, for example, statistical ranking module 120 may compare one or more elements of the longitudinal encrypted patient data 126 corresponding to a patient to averages of the one or more elements of the longitudinal encrypted patient data 126 across a set of patients. Based on the comparison of the one or more elements of the longitudinal encrypted patient data 126, the statistical ranking module 120 may assign one or more ratings to a patient. In other words, for each element of the longitudinal encrypted patient data 126 (e.g., volume of each type of pharmaceutical product the patient has purchased and percentage of purchases that were made with cash), the statistical ranking module 120 may assign a rating to a patient that reflects how an element of the longitudinal encrypted patient data 126 compares to that same element of other encrypted patients in a set. Encrypted patients in the set used in the comparison may be patients in the same location (e.g., country, state, city, or zip code), patients who share similar patient data (e.g., medical diagnosis or demographic information), and/or patients who share some other relationship.

For example, the longitudinal encrypted patient data 126 corresponding to a first patient may indicate that, over the last month, the first patient has filled prescriptions for five hundred tablets of oxycodone. The longitudinal encrypted patient data 126 may also indicate that, over the same time period, an average patient located in the first patient's zip code that has been prescribed oxycodone only purchases fifty tablets of oxycodone. Based on this information, the statistical ranking module 120 may determine a volume rating to the first user that indicates the user has purchased an abnormally large volume of oxycodone.

Similarly, the statistical ranking module 120 may compare one or more elements of the prescription data 132 corresponding to a prescriber to values of the one or more elements of the prescription data 132 across a set of related prescribers. Based on the comparison of the one or more elements of the prescription data 132 linked to a prescriber, the statistical ranking module 120 may assign one or more ratings to a prescriber. Prescribers in the set used in the comparison may be prescribers in the same location (e.g., country, state, city, or zip code), prescribers who share similar professional data (e.g., specialty or demographic information), and/or prescribers who share some other relationship.

The statistical ranking module 120 may also compare one or more elements of the outlet data 130 corresponding to a retail outlet to values of the one or more elements of the outlet data 130 across a set of related retail outlets. Based on the comparison of the one or more elements of the outlet data 130, the statistical ranking module 120 may assign one or more ratings to an outlet. Retail outlets in the set used in the comparison may be retail outlets in the same location (e.g., country, state, city, or zip code), outlets who share similar commercial data (e.g., size of the retail outlet), and/or outlets who share some other relationship.

The statistical ranking module 120 may take into account any relevant patient data 126, prescriber data 128, prescription data 132 and outlet data 130 when rating any one patient, prescriber, or retail outlet. For example, in some implementations, the statistical ranking module 120 may assign ratings to patients based on one or more elements of the prescription data 132 and/or one or more elements of the outlet data 130, or one or more elements of the prescriber data, or one or more elements of the combination of the previously mentioned information linked together. By way of example, the statistical ranking module 120 may calculate a rating for a patient based on prescription data 132 associated with one or more prescriber data 128 that are associated with the patient data 126 (e.g., prescribers that have written the patient one or more prescriptions) and/or outlet data 130 associated with one or more retail outlets that are associated with the patient (e.g., retail outlets from which the patient has purchased one or more pharmaceutical products). Similarly, the statistical ranking module 120 may assign ratings to prescribers based on one or more elements of the patient data 126 and/or one or more elements of the outlet data 130. The statistical ranking module 120 may also assign ratings to retail outlets based on one or more elements of the patient data 126 and/or one or more elements of the prescription data 132 and/or one or more elements of the prescriber data 128 and/or one or more elements of the combination of the previously mentioned information linked together.

The ratings assigned to a patient, prescriber, and/or retail outlet by the statistical ranking module 120 may be normalized numbers that reflect the analysis performed with regard to an element of the patient data 126, prescription data 128, outlet data 130, prescriber data 132, and/or a combination thereof. In some implementation, the ratings determined by the statistical ranking module 120 may be updated on a periodic basis (e.g., weekly or monthly) or updated anytime new data regarding the element corresponding to the rating is received by the computer system 100. Alternatively, in some implementations, the ratings determined by the statistical ranking module 120 may be calculated every time the statistical ranking module 120 receives a query for the ratings.

The statistical ranking module 120 may also calculate a composite rating for each patient, prescriber, and/or retail outlet for which data has been received by the computer system 100. In some implementations, for example, the statistical ranking module 120 may weight each of the individual element ratings associated with a patient, prescriber, or retail outlet and apply an equation to calculate a composite of the individual element ratings. Alternatively, in some implementations, the statistical ranking module 120 may select a subset of less than all available individual element ratings and calculate a composite rating based on the selected individual element ratings.

In some implementations, the statistical ranking module 120 may rank patient, prescriber, and/or retail outlet with respect to one another based on the determined ratings. For example, the statistical ranking module 120 may rank all of the patients in a given location (e.g., a zip code) based on each patient's composite rating. In another example, the statistical ranking module 120 may rank all of the prescribers who are oncologists in a given state based on each prescribers rating related to the volume of one or more types of pharmaceutical products for which the prescriber has written a prescription (i.e., an element of the prescriber data 128).

The controlled substances report module 122 prepares reports based on the metrics and measures from the data processing module and ratings and/or rankings calculated by the statistical ranking module 120. The reports prepared by the controlled substances report module 122 may include one or more of the ratings calculated by the statistical ranking module 120 as well as any other data contained in the patient data 126, prescriber data 128 and/or outlet data 130. For example, a report generated by the controlled substances report module 122 may include composite ratings for all prescribers in a given state for a particular pharmaceutical product (e.g., oxycodone—a controlled substance).

The reports generated by the controlled substances report module 122 may be filtered based on any one or more criteria associated with a patient, prescriber, and/or retail outlet. For example, the controlled substances report module 122 may filter reports based on location, type pharmaceutical product, medical specialty of a prescriber, category of a retail outlet (e.g., large chain retail outlet), and or one or more ratings calculated by the statistical ranking module 120. In other words, any data received and processed by the data processing module 118 or any ratings or rankings calculated by the statistical ranking module 120 may be included in or used to filter the data included a report generated by controlled substances report module 122.

Additionally, in some implementations, the reports generated by the controlled substances report module 122 may be either dynamic or static. For example, the controlled substances report module 122 may generate a report that includes data presented in one or more static formats (e.g., a chart, a graph, or a table) without providing any mechanism for altering the format and/or manipulating the data presented in the report. In some implementations, for example, the controlled substances report module 122 may provide a static report in a PDF, spreadsheet, or XML format.

Additionally or alternatively, the controlled substances report module 122 may generate a report that includes controls allowing a user to alter and/or manipulate the report itself. For example, the controlled substances report module 122 may provide a dynamic report in the form of an HTML document that includes controls for filtering, manipulating, and/or ordering the data displayed in the report. Moreover, a dynamic report may include the capability of switching between numerous visual representations of the included in the dynamic report. In some implementations, a dynamic report may provide direct access to some or all of the encrypted patient data 126, prescriber data 128, outlet data 130, and/or prescription data 132 in an aggregated or un-aggregated form, prepared by the data processing module 118 and/or the statistical ranking module 120, as opposed to allowing access to only data and/or ratings included in the report itself. Examples of reports generated by the controlled substances report module 122 will be described with regard to FIGS. 3-6.

One or more clients 140 may interface with the computing system 100 to request and receive reports created by the controlled substances report module 122. In some implementations, for example, the one or more clients 140 may include a web browser that provides Internet-based access to the computing system 100. Through the web browser, a user of a client 140 (e.g., a wholesaler, a retail outlet or corporate entity, or a prescriber) may request a static or dynamic report from the controlled substances report module 122.

In some implementations, access to the computing system 100 may be controlled in order to protect any confidential data stored in the computing system 100. For example, in some implementation, each user of a client 140 that attempts to request a report from the computing system 100 may be required to use a log in ID created by the owner/operator of the system 100 (e.g., IMS Health) and create a password to log into a user account. The user accounts may include identifying information about the user that may be used to limit the user's access to particular types of data, reports, and/or other functionality. For example, a user account associated with a prescriber may limit the prescriber to only viewing prescriber rating data for prescribers in his/her area and/or patient rating data for the patient's with which the prescriber has a professional relationship. Moreover, the user account associated with a prescriber may limit—the level of detail of the data included in a report to prevent the prescriber from accessing another prescriber's private data.

There may be any number of clients 140 associated with, or external to, the example computing system 100. For example, while the illustrated example computing system 100 is shown in communication with one client 140, alternative implementations of the example computing system 100 may communicate with any number of clients 140 suitable to the purposes of the example computing system 100. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing or communication device such as a desktop computer, laptop/notebook computer, wireless data port, smart phone, personal data assistant (PDA), tablet computing device, one or more processors within these devices, or any other suitable processing device available today or created in the future. For example, the client 140 may comprise a computer that includes an input device, such as a keypad, touch screen, or other device that can accept user information, and an output device that conveys information associated with the operation of the computing system 100.

In some implementations, functionality described as being performed by the computing system 100 may be performed by the client 140. For example, the computing system 100 may provide a client 140 with direct access to the ratings and rankings calculated by the statistical ranking module 120. As a result, some or all of the functionality described as being performed by the controlled substances report module 122 may be performed by the client 140.

Figure 2:
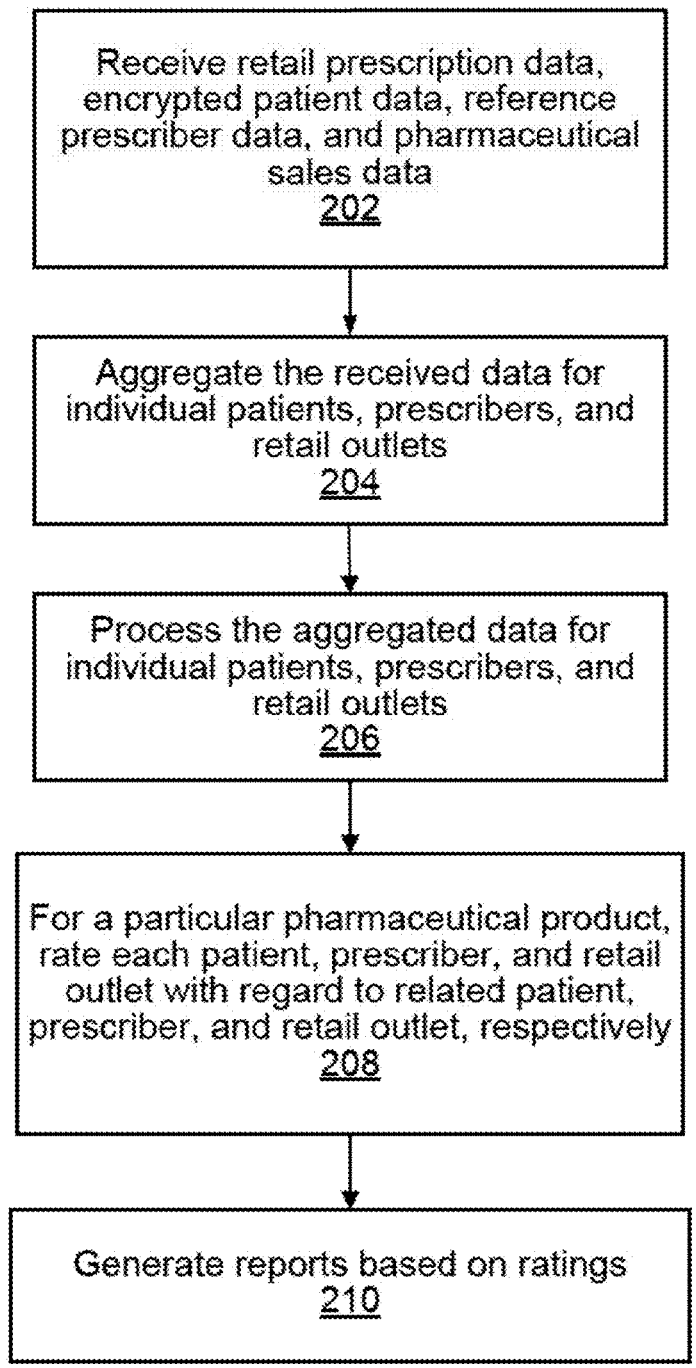
FIG. 2 is a flow chart for rating and ranking stakeholders in the distribution of controlled substances.

Turning now to FIG. 2, FIG. 2 illustrate a flow chart 200 for rating and ranking stakeholders in the distribution of controlled substances. For clarity of presentation, the description that follows generally describes method 200 in the context of FIG. 1. However, it will be understood that method 200 may be performed, for example, by any other suitable system, environment, software, and hardware, or a combination of systems, environments, software, and hardware as appropriate. For example, one or more of the data processing module 118, the statistical ranking module 120, the controlled substances reporting module 122, the client 140, or other computing device (not illustrated) can be used to execute method 200 and obtain any data from the memory of the client 140, the data processing module 118, the statistical ranking module 120, the controlled substances reporting module 122, or the other computing device (not illustrated).

At 202, the data processing module receives retail prescription data, encrypted patient data, reference prescriber data, and/or pharmaceutical purchase data. The data processing module may receive the various data from one or more retail outlets, patients, prescribers, distributors, and/or other parties with access to the data. Moreover, in some implementations, the data processing module receives the retail prescription data, encrypted patient data, reference prescriber data, and/or pharmaceutical purchase data from other computing systems (e.g., data collection systems).

At 204, the data processing module aggregates the received retail prescription data, encrypted patient data, reference prescriber data, and/or pharmaceutical purchase data for individual patients, prescribers, and retail outlets. For example, retail prescription data may include information about a retail outlet that dispenses one or more types of pharmaceutical products, information about one or more encrypted patient IDs that purchased the types of pharmaceutical products, and information about one or more prescribers that wrote the scripts used by the patients to obtain the pharmaceutical products. In this example, the data processing module may add information contained in the received retail prescription data into profiles associated with the retail outlet, the one or more patients, and the one or more prescribers. During aggregation, relationships between prescriber and outlet, patient and outlet, and/or prescriber and patient may be established.

At 206, the data processing module processes the aggregated retail prescription data, longitudinal encrypted patient data, reference prescriber data, and/or pharmaceutical purchase data for individual patients, prescribers, and retail outlets. In some implementations, processing the aggregated data may include deriving metrics from the aggregated data. The derived metrics may not be inherent in the aggregated data. For example, the data processing module may calculate ratios with the aggregated data (e.g., the percent of purchases paid for with cash for a particular type of pharmaceutical product relative to percentage of purchases paid for with cash purchases for all products).

At 208, the statistical ranking module rates each encrypted patient ID, prescriber, and retail outlet with regard to related patient IDs, prescribers, and retail outlets, respectively. In some implementations, to rate a patient, prescriber, or retail outlet, the statistical ranking module 120 may compare one or more elements of the encrypted patient data, prescriber data, or outlet data corresponding to a patient ID, prescriber, or outlet to averages of the one or more elements of the encrypted patient data, prescriber data, or outlet data across a set of related patient IDs, prescribers, or outlets. Based on the comparison of the one or more elements of the encrypted patient data, prescriber data, or outlet data the statistical ranking module may assign one or more ratings to a patient ID.

For example, the encrypted patient data corresponding to a first patient ID may indicate that, over the last month, the first patient ID has paid for fourteen prescriptions for a controlled substance with cash. The encrypted patient data may also indicate that, over the same time period, an average patient ID located in the first patient ID's state that has been prescribed the same controlled substance only paid for one prescription of the controlled substance with cash. Based on this information, the statistical ranking module may determine a payment rating to the first patient ID that indicates the patient ID has paid for an abnormally large number of prescriptions with cash.

In some implementations, the ratings calculated by the statistical ranking module may additionally or alternatively take into account any relevant encrypted patient data 126, prescriber data 128, prescription data 132 and outlet data 130 (or combination thereof) when rating any one patient, prescriber, or retail outlet. For example, in some implementations, the statistical ranking module 120 may assign ratings to patient IDs based on one or more elements of the prescriber data 128 and/or one or more elements of the outlet data 130 and/or one or more elements of prescription data 132. Similarly, the statistical ranking module 120 may assign ratings to prescribers based on one or more elements of the patient data 126 and/or one or more elements of the outlet data 130 and/or one or more elements of prescription data 132. The statistical ranking module 120 may also assign ratings to retail outlets based on one or more elements of the patient data 126 and/or one or more elements of the prescriber data 128 and/or one or more elements of prescription data 132.

As described above, the ratings assigned to a patient, prescriber, and/or retail outlet by the statistical ranking module may be normalized numbers that reflect the analysis performed with regard to an element of the patient data, prescriber data and/or outlet data. Moreover, the statistical ranking module may calculate a composite or overall rating for a patient, prescriber, and/or retail outlet based on individual ratings associated with one or more elements of the patient data, prescriber data and/or outlet data. For example, a prescriber may be assigned a composite rating calculated from a statistical function of some or all of the individual ratings associated with elements of the prescriber data received for the prescriber.

At 208, the controlled substances report module generates reports based on the ratings calculated by the statistical ranking module. As described above, the reports prepared by the controlled substances report module may include one or more of the ratings calculated by the statistical ranking module as well as any other data contained in the patient data, prescriber data and/or outlet data. Moreover, the reports generated by the controlled substances report module may be requested by a client and tailored to the needs of a particular user.

FIGS. 3-6 illustrate example reports that may be generated by the controlled substances report module. The reports illustrated in FIGS. 3-6 are examples of dynamic reports, because the reports illustrated in FIGS. 3-6 include controls that allow a user to alter and manipulate the report. FIGS. 3-6 are not meant to limit the scope of the reports that may be generated by the controlled substances report module. Rather, the controlled substances report module may generate reports that include similar information in a different format than that shown in FIGS. 3-6 or may generate entirely different reports based on the information collected and generated by the system.

Figure 3:
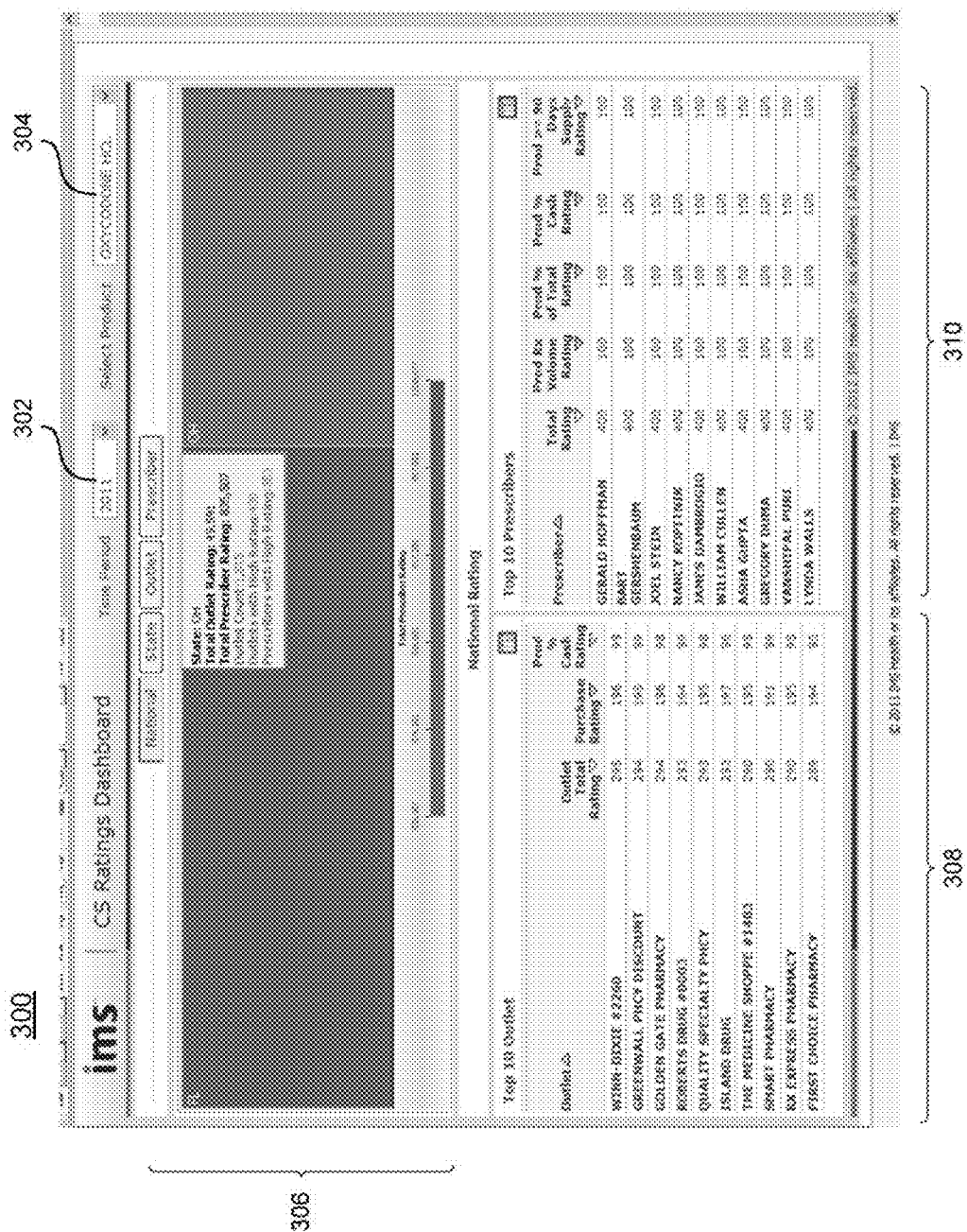
FIGS. 3-6 illustrate example reports generated based on the rating and ranking stakeholders in the distribution of controlled substances.

FIG. 3 illustrates a dynamic report 300 generated by the controlled substances report module. A user of a client may log into the computer system and request the report 300. For example, the user could open a web browser on the client, log into the computer system, and request the report 300. Alternatively, the controlled substances report module could communicate the report 300 through any appropriate means of communication with or without user request (the report could be produced on demand or scheduled). Moreover, though the report 300 is shown with a particular layout, the information included in report 300 could be presented in any format that would be useful to a user.

Report 300 is a nation report that presents ratings of prescribers and outlets nationwide. Specifically, report 300 includes filtering controls 302 and 304. Filtering control 302 allows a user to filter the information included in the report 300 by a period of time (e.g., a year). For example, if a user interacts with filtering control 302 to select the year 2011, the report 300 will only display data and ratings corresponding to prescribers and outlets relevant to the year 2011. Filtering time periods could be any period of time including, for example, monthly or quarterly. Filtering control 304 allows a user to filter the information included in the report 300 by a type of pharmaceutical product (e.g., a particular controlled substance). For example, if a user interacts with filtering control 304 to select the pharmaceutical product oxycodone HCL, the report 300 will only display data and ratings corresponding to prescribers and outlets relevant to the pharmaceutical product oxycodone HCL. The processing necessary to filter the data and render the display of the report 300 based on the filtering controls 302 and 304 may be executed at either the client or at the computer system (by, for example, controlled substances report module). Additional filtering capability will also include outlet type and/or prescriber specialty.

Report 300 includes data displays 306, 308, and 310. Data display 306 includes a graphical representation of the—prescriber ratings in each state for which data has been received. For example, as shown in FIG. 3, data display 306 represents a graphical representation of the—prescriber ratings in Florida and Ohio. The graphical representations associated with each state may vary in size and color based on the outlet and prescriber ratings determined to be "high" in the state (e.g., based on an average). For example, in data display 306, the state of Florida is represented as a large, red square, whereas the state of Ohio is represented as a smaller, green square. Thus, in data display 306, Florida is shown as having a larger size, indicating number of outlets with a high rating, as well as having a red color, indicating a larger number of prescribers with a high rating in 2011 with regard to oxycodone HCL than the number of outlets and prescribers with high ratings in Ohio. Though, data display 306 represents data in the form of boxes, the same data could be represented in a different visual format (e.g., a graph or interactive geographic map with a heat density overlay).

Data display 308 includes a listing of the top ten retail outlets across the nation based on their ratings in 2011 with respect to oxycodone HCL. The outlets displayed in data display 308 each have the highest ratings with respect to the other retail outlets across the nation. For each outlet in the top ten, the data display 308 includes the retail outlet's identifier (e.g., a name and identification number such as DEA), the retail outlets composite rating in 2011 with respect to oxycodone HCL, the retail outlets purchase rating (i.e., a rating based on one or more elements of the outlet data), and the retailer outlets product percentage cash rating (i.e., another rating based on one or more elements of the outlet data).

Similar to data display 308, data display 310 includes a listing of the top ten prescribers across the nation based on their ratings in 2011 with respect to oxycodone HCL. The prescribers displayed in data display 310 each have the highest ratings with respect to the other prescribers across the nation. For each prescriber in the top ten, the data display 308 includes the prescriber's identifier (e.g., a name), the prescriber's composite rating in 2011 with respect to oxycodone HCL, the prescriber's product prescription volume rating (i.e., a rating based on one or more elements of the prescriber and prescription data), the prescriber's product percentage of total rating (i.e., another rating based on one or more elements of the prescriber and prescription data), the prescriber's product percentage of cash rating (i.e., another rating based on one or more elements of the prescriber and prescription data), and the prescriber's product greater than 90-day supply rating (i.e., another rating based on one or more elements of the prescriber, prescription, and patient data).

Though data displays 308 and 310 are shown as including specific ratings for each retail outlet or prescriber listed, the data displays 308 and 310 may include any ratings calculated by the computing system. Moreover, though the data displays 308 and 310 include lists of the retail outlets and prescribers, the data displays 308 and 310 additionally—or alternatively include other data representations of the retail outlets and prescribers included in the top ten (e.g., graphs or location on map).

Figure 4:
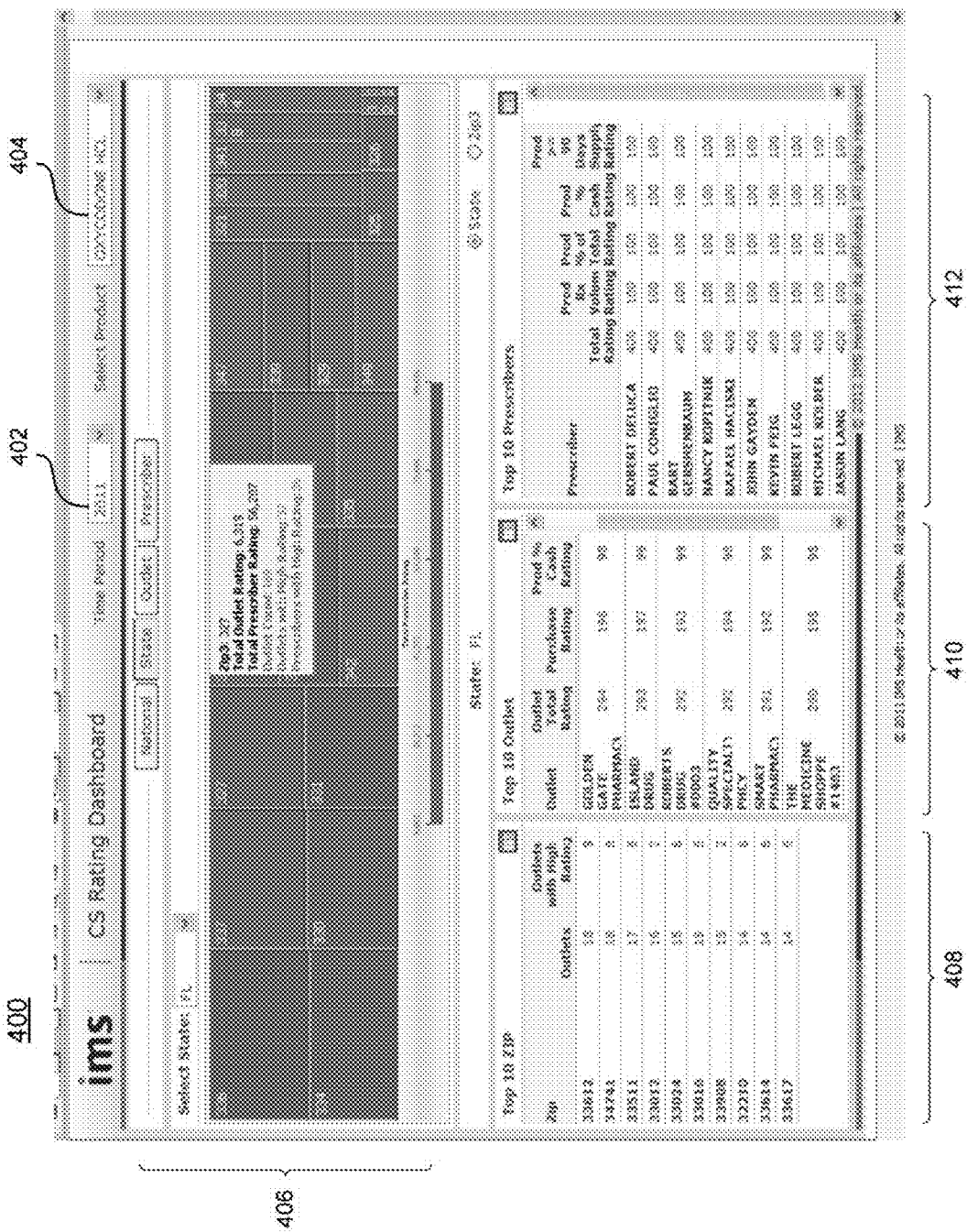

Changes above on the nation screen would apply to the following state view as well. FIG. 4 illustrates a dynamic report 400 generated by the controlled substances report module. A user of a client may log into the computer system and request the report 400. For example, the user could open a web browser on the client, log into the computer system, and request the report 400. Alternatively, the controlled substances report module could communicate the report 400 through any appropriate means of communication. Moreover, though the report 400 is shown with a particular layout, the information included in report 400 could be presented in any format that would be useful to a user.

Report 400 is a state report that presents ratings of prescribers and outlets within a state (e.g., Florida). Specifically, report 400 includes filtering controls 402 and 404. Filtering control 402 allows a user to filter the information included in the report 400 by a period of time (e.g., a year). For example, if a user interacts with filtering control 402 to select the year 2011, the report 400 will only display data and ratings corresponding to prescribers and outlets relevant to the year 2011. Filtering control 404 allows a user to filter the information included in the report 400 by a type of pharmaceutical product (e.g., a particular controlled substance). For example, if a user interacts with filtering control 404 to select the pharmaceutical product oxycodone HCL, the report 400 will only display data and ratings corresponding to prescribers and outlets relevant to the pharmaceutical product oxycodone HCL. The processing necessary to filter the data and render the display of the report 400 based on the filtering controls 402 and 404 may be executed at either the client or at the computer system (by, for example, controlled substances report module).

Report 400 includes data displays 406, 408, 410, and 412. Data display 406 includes a graphical representation of the prescriber ratings in each area of a state (e.g., each zip3—the first three numbers of a zip code) for which data has been received. For example, as shown in FIG. 4, data display 408 represents a graphical representation of the prescriber ratings in zip3s such as "336", "334", and "337" in Florida. The data display 406 may alternatively be organized by other types of areas (e.g., 5-digit zip code, county, district, or area code). The graphical representations associated with each area may vary in size and color based on the prescriber ratings in the area. For example, in data display 308, the zip3 of "336" is represented as a large, red square, whereas the zip3 of "335" is represented as a smaller, green square. Thus, in data display 408, the zip3 of "336" is shown as being associated with higher prescriber ratings in 2011 with regard to oxycodone HCL than the prescriber ratings associated with the zip3 of "335". Though, data display 406 represents data in the form of boxes, the same data could be represented in a different visual format (e.g., a graph).

Data display 408 includes a listing of the top ten zip codes within the state based on the retail outlet ratings in 2011 with respect to oxycodone HCL associated with each zip code. The outlets displayed in data display 408 each have the highest ratings with respect to the other retail outlets across the nation. For each zip code in the top ten, the data display 408 includes the five-digit zip code, the number of retail outlet's located in the zip code, and the number of retail outlet's located in the zip code that have a composite rating in 2011 with respect to oxycodone HCL that exceeds a threshold.

Similar to data display 408, data display 410 includes a listing of the top ten retail outlets within the state based on their ratings in 2011 with respect to oxycodone HCL. The outlets displayed in data display 308 each have the highest ratings with respect to the other retail outlets within the state. For each outlet in the top ten, the data display 410 includes the retail outlet's identifier (e.g., a name and identification number), the retail's composite rating in 2011 with respect to oxycodone HCL, the retail's purchase rating (i.e., a rating based on one or more elements of the outlet data), and the retailer's product percentage cash rating (i.e., another rating based on one or more elements of the outlet data).

Similar to data displays 408 and 410, data display 412 includes a listing of the top ten prescribers within the state based on their ratings in 2011 with respect to oxycodone HCL. The prescribers displayed in data display 412 each have the highest ratings with respect to the other prescribers across the nation. For each prescriber in the top ten, the data display 412 includes the prescriber's identifier (e.g., a name), the prescriber's composite rating in 2011 with respect to oxycodone HCL, the prescriber's product prescription volume rating (i.e., a rating based on one or more elements of the outlet data), the prescriber's product percentage of total rating (i.e., another rating based on one or more elements of the outlet data), the prescriber's product percentage of cash rating (i.e., another rating based on one or more elements of the outlet data), and the prescriber's product greater than 90-day supply rating (i.e., another rating based on one or more elements of the outlet data).

Though data displays 408, 410, and 412 are shown as including specific ratings for each zip code, retail outlet, or prescriber listed, the data displays 408, 410, and 412 may include any ratings calculated by the computing system. Moreover, though the data displays 408, 410, and 412 include lists of the zip codes, retail outlets, and prescribers, the data displays 408, 410, and 312 additionally or alternatively include other data representations of the zip codes, retail outlets, and prescribers included in the top ten (e.g., graphs).

Figure 5:
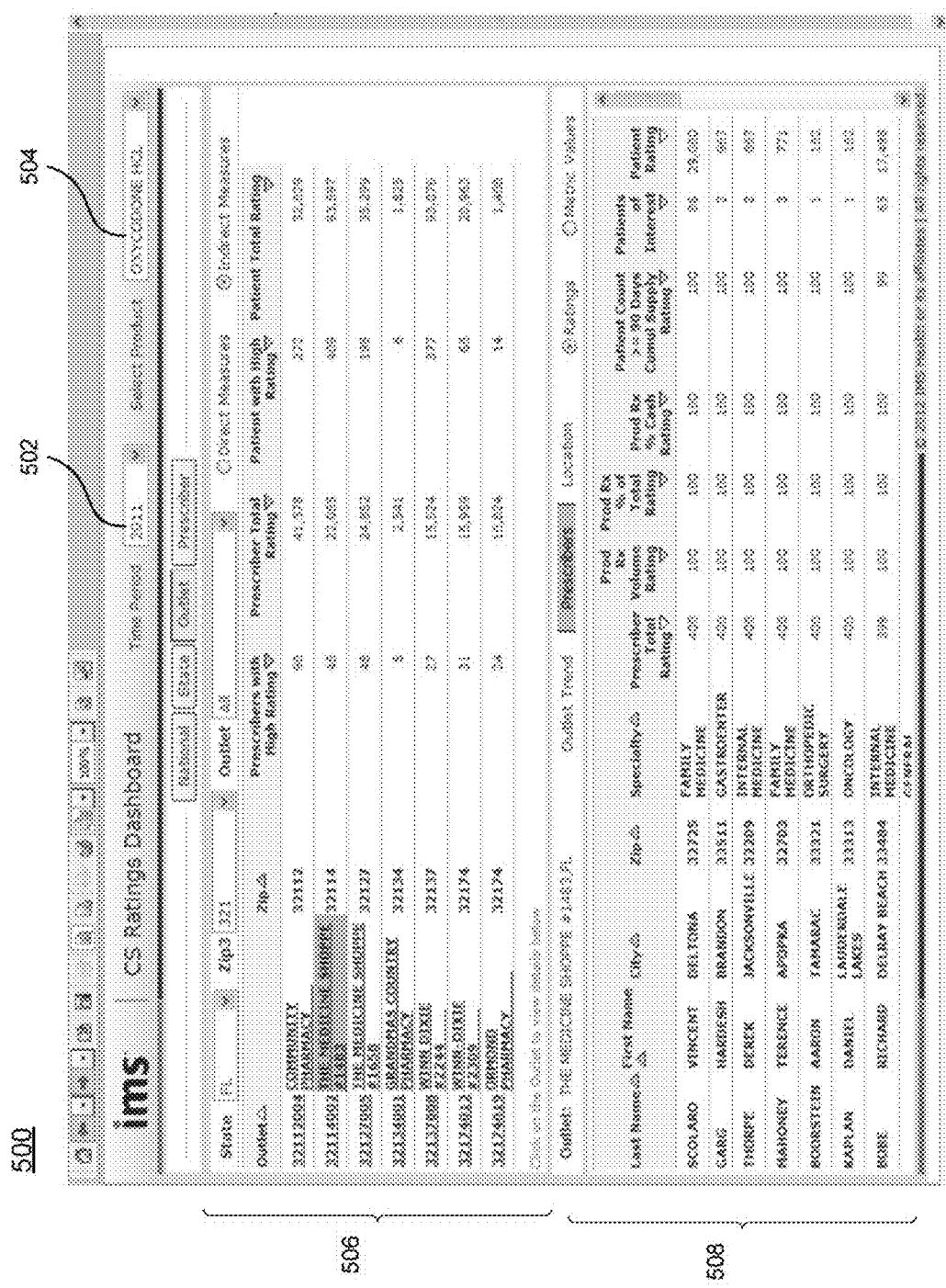

FIG. 5 illustrates a dynamic report 500 generated by the controlled substances report module. A user of a client may log into the computer system and request the report 500 or the report could be scheduled, produced and delivered to a user/customer. For example, the user could open a web browser on the client, log into the computer system, and request the report 500. Alternatively, the controlled substances report module could communicate the report 500 through any appropriate means of communication available today or by any communication means that may become available in the future. Moreover, though the report 500 is shown with a particular layout, the information included in report 500 could be presented in any format that would be useful to a user.

Report 500 is a retail outlet report that presents ratings of retail outlets within a selected geography. Specifically, report 500 includes filtering controls 502 and 504. Filtering control 502 allows a user to filter the information included in the report 500 by a period of time (e.g., a year). For example, if a user interacts with filtering control 502 to select the year 2011, the report 500 will only display data and ratings corresponding to prescribers and outlets relevant to the year 2011. Monthly and or quarterly time period selections could also be available. Filtering control 504 allows a user to filter the information included in the report 500 by a type of pharmaceutical product (e.g., a particular controlled substance). For example, if a user interacts with filtering control 304 to select the pharmaceutical product oxycodone HCL, the report 500 will only display data and ratings corresponding to prescribers and outlets relevant to the pharmaceutical product oxycodone HCL. The processing necessary to filter the data and render the display of the report 500 based on the filtering controls 502 and 504 may be executed at either the client or at the computer system (by, for example, controlled substances report module).

Report 500 includes data displays 506 and 508. Data display 506 includes a detailed listing of the retail outlets within an area (e.g., zip3) of a state based on their ratings in 2011 with respect to oxycodone HCL. For each outlet in the area of the state, the data display 506 includes the retail outlet's identifier (e.g., a name and DEA identification number), an indication of the retail outlet's location (e.g., address, zip code), the number of prescribers associated with the retail outlet that have a rating in excess of a threshold, the total rating for all of the prescribers associated with the retail outlet, the number of patients associated with the retail outlet that have a rating in excess of a threshold, and the average overall rating for all of the patients associated with the retail outlet. Additional rating information as well as aggregated data derived from prescription, outlet, prescriber, and or patient data will also be displayed.

Data display 508 includes a detailed display of the data associated with a retail outlet selected from the list of retail outlets displayed in data display 506. In the example of data display 508 shown in FIG. 5, the data display 508 includes details about prescribers associated with the selected retail outlet (selected form section 506 and displayed at the top of section 508). For each prescriber associated with the selected retail outlet, the data display 508 includes the prescriber's identifier (e.g., a name and DEA number), the prescriber's location (e.g., a city and a zip code), distance (zip centroid of outlet to zip centroid of prescriber) from the retail outlet, the prescriber's professional specialty, the prescriber's overall rating in 2011 (the time period selected with respect to oxycodone HCL (the product selected), the prescriber's product prescription volume rating (i.e., a rating based on one or more elements of the prescriber and prescription data), the prescriber's product percentage of total rating (i.e., another rating based on one or more elements of the prescriber and prescription data), the prescriber's product percentage of cash rating (i.e., another rating based on one or more elements of the prescriber and prescription data), the prescriber's product greater than 90-day supply rating (i.e., another rating based on one or more elements of the prescriber, patient and prescription data), the number of patients associated with the prescriber that have a overall rating in excess of a threshold, and the average overall rating for all of the patients associated with the prescriber.

Though data displays 506 and 508 are shown as including specific ratings for each retail outlet listed, the data displays 506 and 508 may include any ratings calculated by the computing system. Moreover, though the data displays 506 and 508 include lists of the retail outlets, the data displays 506 and 508 additionally or alternatively may include other data representations of the retail outlets (e.g., graphs).

Figure 6:
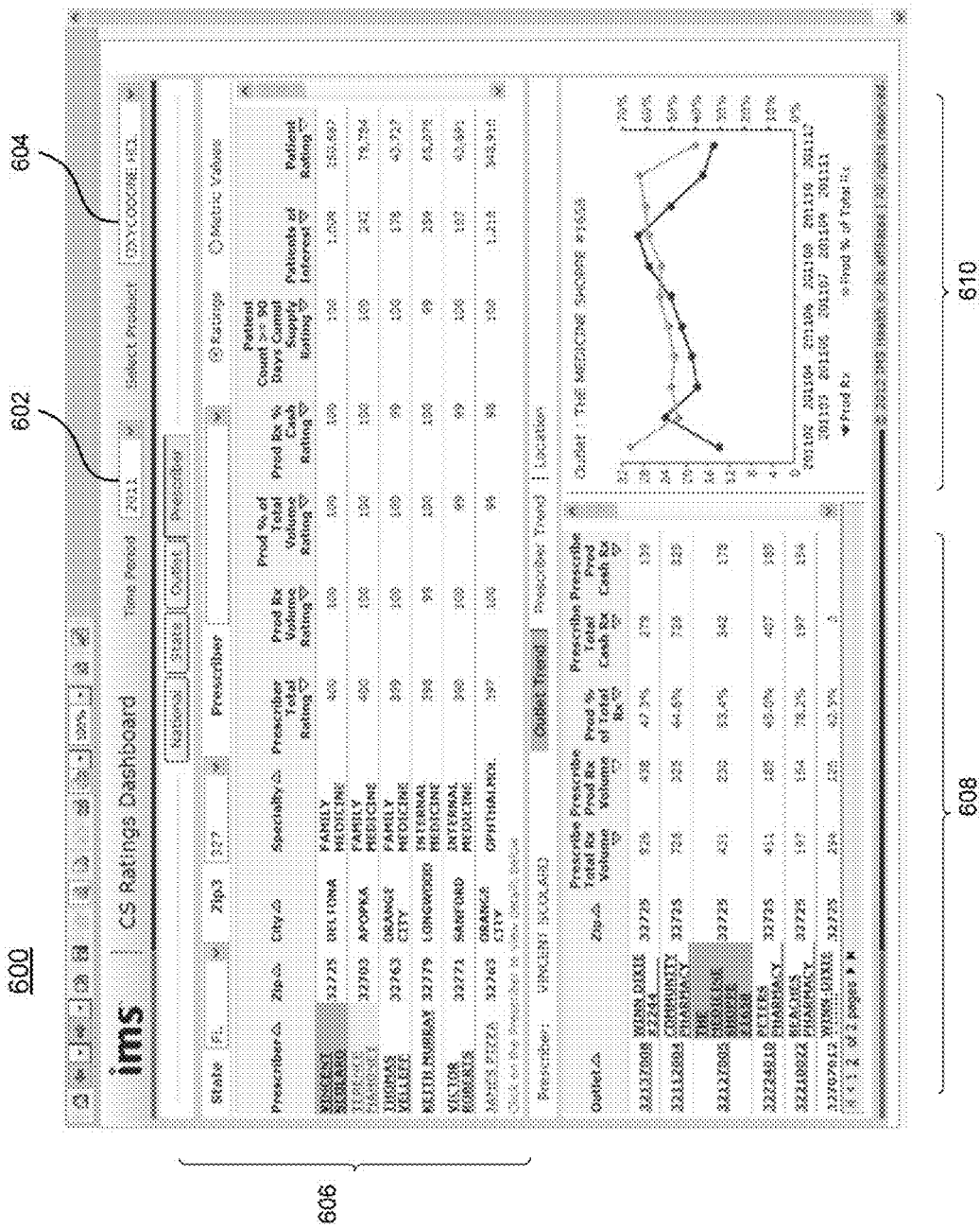

FIG. 6 illustrates a dynamic report 600 generated by the controlled substances report module. A user of a client may log into the computer system and request the report 600. For example, the user could open a web browser on the client, log into the computer system, and request the report 600. Alternatively, the controlled substances report module could communicate the report 600 through any appropriate means of communication. Moreover, though the report 600 is shown with a particular layout, the information included in report 600 could be presented in any format that would be useful to a user.

Report 600 is a prescriber report that presents ratings of prescribers within a state. Specifically, report 600 includes filtering controls 602 and 604. Filtering control 602 allows a user to filter the information included in the report 600 by a period of time (e.g., a year, quarter, month). For example, if a user interacts with filtering control 602 to select the year 2011, the report 600 will only display data and ratings corresponding to prescribers and outlets derived from information received for the year 2011. Filtering control 604 allows a user to filter the information included in the report 600 by a type of pharmaceutical product (e.g., a particular controlled substance). For example, if a user interacts with filtering control 604 to select the pharmaceutical product oxycodone HCL, the report 600 will only display data and ratings corresponding to prescribers and outlets relevant to the pharmaceutical product oxycodone HCL. The processing necessary to filter the data and render the display of the report 600 based on the filtering controls 602 and 604 may be executed at either the client or at the computer system (by, for example, controlled substances report module).

Report 600 includes data displays 606, 608 and 610. Data display 606 includes a detailed listing of the prescribers within an area (e.g., zip3) of a state based on their ratings in 2011 (the time period selected) with respect to oxycodone HCL (the selected product). For each prescriber in the area of the state, the data display 606 includes the prescriber's identifier (e.g., a name), the prescriber's location (e.g., a city and a zip code), the prescriber's professional specialty, the prescriber's composite rating in 2011 with respect to oxycodone HCL, the prescriber's product prescription volume rating (i.e., a rating based on one or more elements of the prescriber and prescription data), the prescriber's product percentage of total rating (i.e., another rating based on one or more elements of the prescriber and prescription data), the prescriber's product percentage of cash rating (i.e., another rating based on one or more elements of the prescriber and prescription data), the prescriber's product greater than 90-day supply rating (i.e., another rating based on one or more elements of the prescriber and prescription data), the number of patients associated with the prescriber that have a rating in excess of a threshold, and the total rating for all of the patients associated with the prescriber.

Data display 608 includes a detailed display of the data associated with a prescriber selected from the list of prescribers displayed in data display 606. In the example of data display 608 shown in FIG. 6, the data display 608 includes details about retail outlets associated with the selected prescriber. For each retail outlet associated with the selected prescriber, the data display 608 includes the retail outlet's identifier (e.g., a name and DEA number), an indication of the retail outlet's location (e.g., address, zip code), distance from prescriber, the retail outlet's total prescription volume rating for all filled prescriptions (i.e., a rating based on one or more elements of the outlet data), the retail outlet's product prescription volume rating for the filtered product (i.e., another rating based on one or more elements of the outlet data), the retail outlet's product percentage of total rating (i.e., another rating based on one or more elements of the outlet data), the retail outlet's total percentage of cash rating for all filled prescriptions (i.e., another rating based on one or more elements of the outlet data), and the retail outlet's product percentage of cash rating for the filtered product (i.e., another rating based on one or more elements of the outlet data).

Data display 610 includes a detailed display of the data associated with a retail outlet selected from the list of retail outlets displayed in data display 608. For the selected retail outlet, the data display 610 includes a graph of the amount of the filtered product sold over time (i.e., "Prod Rx") and the retail outlet's amount of filtered product sold as a percentage of all products sold by the retail outlet over time (i.e., "Prod % of Total Rx").

Though data displays 606, 608, and 610 are shown as including specific ratings for each prescriber and retail outlet listed, the data displays 606, 608, and 610 may include any ratings calculated by the computing system. Moreover, though the data displays 506 and 508 include lists of the prescribers and retail outlets, the data displays 506 and 508 additionally or alternatively may include other data representations of the retail outlets (e.g., graphs).

Figure 7:
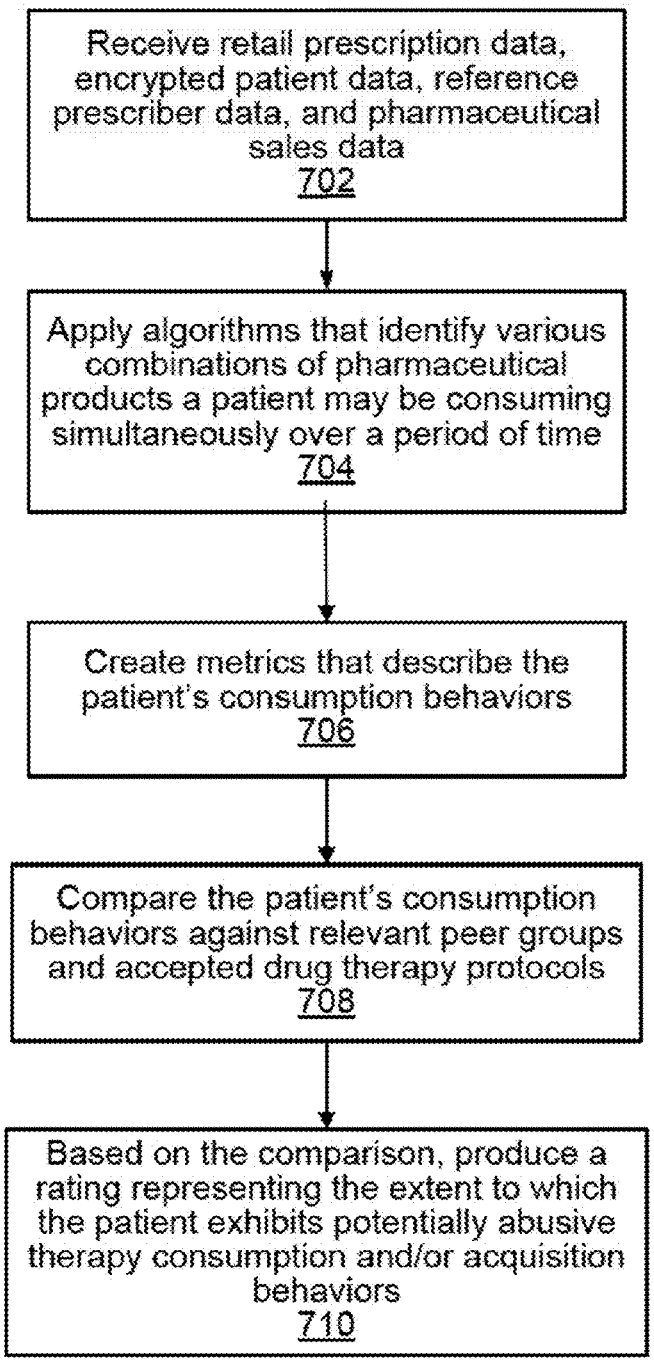
FIG. 7 is a flow chart for rating a patient's pharmaceutical acquisition and consumption behavior.

As described above, the data received by the controlled substances rating system may be used to identify other pharmaceutical product supply chain disruptions. For example, the received data regarding distributors, patients, prescribers, and pharmaceutical retailers may be used to identify patients that purchase combinations of pharmaceutical products that would result in adverse or non-medicinal effects. Accordingly, FIG. 7 is a flow chart of a process 700 for rating a patient's pharmaceutical acquisition and consumption behavior based on combinations of pharmaceutical products.

At 702, the system receives retail prescription data, encrypted patient data, reference prescriber data, and/or pharmaceutical purchase data. The system may receive the various data from one or more retail outlets, patients, prescribers, distributors, and/or other parties with access to the data. Moreover, in some implementations, the system receives the retail prescription data, encrypted patient data, reference prescriber data, and/or pharmaceutical purchase data from other computing systems (e.g., data collection systems). The retail prescription data, encrypted patient data, reference prescriber data, and/or pharmaceutical purchase data collected by the system may be the same types of data collected by the data processing module as part of process 200. In this or other implementations, the system may receive retail prescription data that includes information pertaining to the patient, the prescriber, and the dispensing outlet for various pharmaceutical products a patient may be consuming over a particular period of time.

At 704, the system applies one or more algorithms that identify various combinations of pharmaceutical products a patient may be consuming simultaneously over a particular period of time. For example, for each pharmaceutical product purchased by a particular patient, the system may determine any other pharmaceutical products purchased by the particular patient within a particular period of time and compare the purchased pharmaceutical products against one or more lists of pharmaceutical products known to be used in combinations for non-medical purposes.

A patient may consume certain combinations of pharmaceutical products based on a legitimate therapy regimen designed for a specific medical condition. For example, a patient may consume a specific combination of pharmaceutical products in response to being diagnosed with bronchitis. However, not all combinations of pharmaceutical products are part of a single therapy regimen. In some cases, a patient may consumer different pharmaceutical products for the medical purpose of treating different conditions. In other cases, a patient may consume a combination of pharmaceutical products for non-medical purposes (e.g., recreational abuse). In some implementations, the system identifies patients who have purchased/consumed one or more combinations of pharmaceutical products that are known to have non-medical effects. Additionally or alternatively, the system may identify patients who have purchased/consumed one or more combinations of pharmaceutical products that may have adverse effects for the patient, though the combinations are not associated with non-medical uses.

Depending on the number of prescribers and retail outlets that a patient uses to obtain a combination of pharmaceutical products, standard databases and pharmaceutical systems may not be able to track the patient's activities. For example, a patient may obtain a prescription for a first pharmaceutical product from a first prescriber and fill the prescription at a first pharmaceutical retailer. The same patient may obtain a prescription for a second pharmaceutical product from a second prescriber and fill the prescription at a second pharmaceutical retailer. Though these two pharmaceutical products may or may not be controlled substances, it may be known that, when taken in combination, they may be used for non-medical purposes to achieve adverse or improper effects.

Standard databases and pharmaceutical systems (e.g., a single chain retail outlet's proprietary sales database) may not be able to effectively track such abusive behavior across these multiple retail outlets and prescribers. As described above, the system of process 700 may receive retail prescription data, encrypted patient data, reference prescriber data, and pharmaceutical purchase data representing a nationwide, macro view of the sales of pharmaceutical products. For example, the received retail prescription data, encrypted patient data, reference prescriber data, and pharmaceutical purchase data may be received from across many different retailers, $3^{rd}$ party software adjudication systems, insurers, manufacturing companies, physicians' networks, distribution companies, and/or government organizations. Thus, the received retail prescription data, encrypted patient data, reference prescriber data, and pharmaceutical purchase data may represent a much wider breadth of information than any one company and/or actor within the pharmaceutical product supply chain would have access individually.

In some implementations, the system of process 700 may receive and store a listing (in, for example, a database) of combinations of pharmaceutical products known to be used for non-medical purposes. For example, the system may receive a listing of such combinations from government organizations (e.g., the U.S. Food and Drug Administration), academic/research organizations, and/or any of the other individuals or organizations with knowledge of the production and/or consumption of pharmaceutical products. The algorithm applied in operation 704 may be based in part on the stored listing of combinations.

Additionally or alternatively, the controlled substances rating system described with regard to FIGS. 1 and 2 and/or the system of process 700 may be configured to identify new potentially adverse combinations of pharmaceutical products. For example, the above-described controlled substances rating system may be configured to identify combinations of pharmaceutical products being consumed by patients that have been assigned a relatively high rating in operation 208 of process 200. Additionally or alternatively, the system of process 700 may be configured to identify combinations of pharmaceutical products being consumed by patients that have otherwise been classified as potential substance abusers.

At 706, the system creates metrics to describe patients' pharmaceutical product consumption behavior. For example, these metrics may describe the level of a patient's concurrent drug consumption, the patient's drug purchasing behaviors, and the drug payment methods among other patient-related behaviors. The level of a patient's concurrent drug consumption may, for example, indicate the number of different pharmaceutical products a patient is purchasing/consuming over a particular period of time, the distribution of these pharmaceutical products over different categories (e.g., sedatives, anxiolytics, analgesics, or stimulants), and/or the total amount of pharmaceutical products a patient purchases. The patient's drug purchasing behaviors may, for example, indicate the number of different prescribers and/or retails outlets from which a patient obtains pharmaceutical products and/or the geographic relationship with the prescribers and/or retails outlets from which a patient obtains pharmaceutical products. The drug payment methods may, for example, indicate the percentage of purchases for pharmaceutical products that a patient completes in cash. In some implementations, the metrics created by the system in operation 706 may be based on and/or combined with the ratings and ranking produced by a controlled substances rating system as described with regard to FIGS. 1 and 2.

At 708, the system compares patients' metrics describing the patients' consumption behaviors against relevant peer groups and/or accepted drug therapy protocols. In some implementations, for example, the system may determine a group of patients that share common attributes (e.g., age, gender, geographic proximity, and/or medical diagnosis) and may compare one group member's consumption behaviors against an average of the whole group's consumption behaviors. For example, the system may compare a patient's metrics of concurrent drug consumption against average metrics of concurrent drug consumption across a group of patients that share common attributes to the patient. Additionally or alternatively, the system may compare a patient's consumption behaviors to accepted drug therapy protocols. For example, the system may store information that indicates that a patient diagnosed with stomach cancer may visit multiple different types of prescribers (e.g., an oncologist and a gastroenterologist) and consume one or more combinations of pharmaceutical products that could otherwise be used for non-medical purposes by patients without such a diagnosis.

Based on the comparison of 708, at 710, the system produces one or more ratings representing the extent to which patients exhibit potentially abusive therapy consumption and/or acquisition behaviors. For example, the system may assign above-average ratings to those patients associated with metrics that are abnormal (e.g., outside of an acceptable range) in comparison to metrics associate with patients in the same or similar peer groups. Additionally or alternatively, the system may assign above-average ratings to those patients purchasing/consuming combinations of pharmaceutical products that are not part of accepted drug therapy protocols.

In some implementations, the system may report these ratings to prescribers, retail outlets, or other entities in order to assist these entities in the proper and/or required distribution of pharmaceutical products. These reports may take many different forms, such as those described above with regard to FIGS. 2-6. For example, in some implementations, the system may simply notify an entity (e.g., a prescriber or retail outlet) that an average of the drug combination ratings of the patients with which the entity is interacting is above-average.

In some implementations, though the controlled substances rating system and the system of process 700 do not have access to the identities of individual patients (e.g., names, addresses, social security numbers), these systems may be configured to longitudinally link data associated with a patient based on a common identifier (e.g., a unique character string) that does not otherwise indicate who the patient is. As a result, the systems may report the ratings of individual patients to the entities that interact with these patients based on the patients' common identifier.

Regardless of the method of reporting the ratings produced in operation 710, the produced ratings are not meant to provide a definite determination of the misuse of pharmaceutical products. Rather, the ratings produced in operation 710 are simply meant to assist an entity (e.g., wholesaler, retailer, or prescriber) in identifying potentially suspicious activity and provide an input in determining whether the entity should conduct further investigations into the potentially suspicious activity.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit).

In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method of identifying related records in a stream of encrypted data, the method comprising:
    receiving a first stream of encrypted transaction data from a first stream source, the encrypted transaction data including a first transaction with a first encrypted field that reflects one or more results from at least one unencrypted parameter that has been encrypted;
    receiving a second stream of encrypted transaction data from a second stream source, the encrypted transaction data including a second transaction with a second encrypted field that reflects one or more results from at least one unencrypted parameter that has been encrypted;
    generating, based on the first encrypted field and within a longitudinal database, a first longitudinal mapping for the first transaction;
    generating, based on the second encrypted field and within the longitudinal database, a second longitudinal mapping for the second transaction;
    generating, within the longitudinal database, an association between the first and second longitudinal mappings;
    associating, from within fields in the first transaction and the second transaction, related fields;
    generating a linked record with one or more linked fields that reflect the related fields;
    referencing a first context record for the first longitudinal mapping, the first context record including a first context description and a first range of permitted values that differs from a second context record with a second context description and second range of permitted values, the first context record based on encrypted content from the first stream source; and
    determining whether the linked fields for the linked record falls within the first range of permitted values.

2. The method of claim 1, further comprising generating a compliance profile for a particular patient associated with the linked record with the one or more linked fields that reflect the related fields, the compliance profile including one or more ratio metrics descriptive of the association between the first and second longitudinal mappings.

3. The method of claim 2, wherein determining whether the linked fields for the linked record falls within the first range of permitted values comprises determining that at least one of the linked fields for the linked record falls outside the first range of permitted values; and
    the method further comprises:
        in response to determining that at least one of the linked fields for the linked record falls outside the first range of permitted values, generating an alarm that an incoming message descriptive of the compliance profile lies outside an designated online electronic profile.

4. The method of claim 2, further comprising computing a composite ranking for the particular patient based at least on the values of the one or more computed ratio metrics included within the compliance profile.

5. The method of claim 2, wherein the first stream of encrypted transaction data represents unverified information associated with the particular patient, and the second stream of encrypted transaction data represents verified reference information associated with one or more other patients.

6. The method of claim 1, wherein the first stream of encrypted transaction data comprises data reflecting all pharmaceutical products dispensed by the plurality of retail systems associated with the first stream sources, the data including information about a type of prescription used to obtain each dispensed pharmaceutical product and a payment method used to purchase each dispensed pharmaceutical product.

7. The method of claim 1, wherein the obtained reference electronic data comprises one or more of the following pieces of information for each of the subset of prescriber systems from among the plurality of prescriber systems: demographic information, address, affiliations, governmental authorization data, profession, and specialty.

8. A system comprising:
    one or more computers; and
    one or more computer-readable media including instructions that, when executed by the one or more computers, cause performance of operations comprising:
        receiving a first stream of encrypted transaction data from a first stream source, the encrypted transaction data including a first transaction with a first encrypted field that reflects one or more results from at least one unencrypted parameter that has been encrypted;

receiving a second stream of encrypted transaction data from a second stream source, the encrypted transaction data including a second transaction with a second encrypted field that reflects one or more results from at least one unencrypted parameter that has been encrypted;

generating, based on the first encrypted field and within a longitudinal database, a first longitudinal mapping for the first transaction;

generating, based on the second encrypted field and within the longitudinal database, a second longitudinal mapping for the second transaction;

generating, within the longitudinal database, an association between the first and second longitudinal mappings;

associating, from within fields in the first transaction and the second transaction, related fields;

generating a linked record with one or more linked fields that reflect the related fields;

referencing a first context record for the first longitudinal mapping, the first context record including a first context description and a first range of permitted values that differs from a second context record with a second context description and second range of permitted values, the first context record based on encrypted content from the first stream source; and determining whether the linked fields for the linked record falls within the first range of permitted values.

9. The system of claim 8, further comprising generating a compliance profile for a particular patient associated with the linked record with the one or more linked fields that reflect the related fields, the compliance profile including one or more ratio metrics descriptive of the association between the first and second longitudinal mappings.

10. The system of claim 9, wherein determining whether the linked fields for the linked record falls within the first range of permitted values comprises determining that at least one of the linked fields for the linked record falls outside the first range of permitted values; and the method further comprises:
in response to determining that at least one of the linked fields for the linked record falls outside the first range of permitted values, generating an alarm that an incoming message descriptive of the compliance profile lies outside an designated online electronic profile.

11. The system of claim 9, further comprising computing a composite ranking for the particular patient based at least on the values of the one or more computed ratio metrics included within the compliance profile.

12. The system of claim 9, wherein the first stream of encrypted transaction data represents unverified information associated with the particular patient, and the second stream of encrypted transaction data represents verified reference information associated with one or more other patients.

13. The system of claim 8, wherein the first stream of encrypted transaction data comprises data reflecting all pharmaceutical products dispensed by the plurality of retail systems associated with the first stream sources, the data including information about a type of prescription used to obtain each dispensed pharmaceutical product and a payment method used to purchase each dispensed pharmaceutical product.

14. The system of claim 8, wherein the obtained reference electronic data comprises one or more of the following pieces of information for each of the subset of prescriber systems from among the plurality of prescriber systems: demographic information, address, affiliations, governmental authorization data, profession, and specialty.

15. A non-transitory computer storage device encoded with a computer program, the program comprising instructions that when executed by one or more computers cause the one or more computers to perform operations comprising:

receiving a first stream of encrypted transaction data from a first stream source, the encrypted transaction data including a first transaction with a first encrypted field that reflects one or more results from at least one unencrypted parameter that has been encrypted;

receiving a second stream of encrypted transaction data from a second stream source, the encrypted transaction data including a second transaction with a second encrypted field that reflects one or more results from at least one unencrypted parameter that has been encrypted;

generating, based on the first encrypted field and within a longitudinal database, a first longitudinal mapping for the first transaction;

generating, based on the second encrypted field and within the longitudinal database, a second longitudinal mapping for the second transaction;

generating, within the longitudinal database, an association between the first and second longitudinal mappings;

associating, from within fields in the first transaction and the second transaction, related fields;

generating a linked record with one or more linked fields that reflect the related fields;

referencing a first context record for the first longitudinal mapping, the first context record including a first context description and a first range of permitted values that differs from a second context record with a second context description and second range of permitted values, the first context record based on encrypted content from the first stream source; and determining whether the linked fields for the linked record falls within the first range of permitted values.

16. The device of claim 15, further comprising generating a compliance profile for a particular patient associated with the linked record with the one or more linked fields that reflect the related fields, the compliance profile including one or more ratio metrics descriptive of the association between the first and second longitudinal mappings.

17. The device of claim 16, wherein determining whether the linked fields for the linked record falls within the first range of permitted values comprises determining that at least one of the linked fields for the linked record falls outside the first range of permitted values; and the method further comprises:
in response to determining that at least one of the linked fields for the linked record falls outside the first range of permitted values, generating an alarm that an incoming message descriptive of the compliance profile lies outside an designated online electronic profile.

18. The device of claim 16, further comprising computing a composite ranking for the particular patient based at least on the values of the one or more computed ratio metrics included within the compliance profile.

19. The device of claim 16, wherein the first stream of encrypted transaction data represents unverified information associated with the particular patient, and the second stream of encrypted transaction data represents verified reference information associated with one or more other patients.

20. The device of claim 15, wherein the first stream of encrypted transaction data comprises data reflecting all pharmaceutical products dispensed by the plurality of retail systems associated with the first stream sources, the data including information about a type of prescription used to obtain each dispensed pharmaceutical product and a payment method used to purchase each dispensed pharmaceutical product.

21. The device of claim 15, wherein the obtained reference electronic data comprises one or more of the following pieces of information for each of the subset of prescriber systems from among the plurality of prescriber systems: demographic information, address, affiliations, governmental authorization data, profession, and specialty.

* * * * *